March 28, 1961 H. A. TANNER 2,977,591
FIBROUS MICROWAVE ABSORBER
Filed Sept. 17, 1952
FIG-1
FIG-3  FIG-2
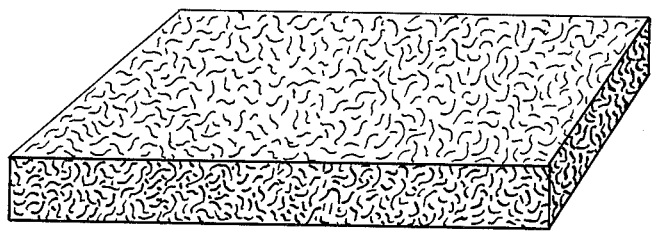
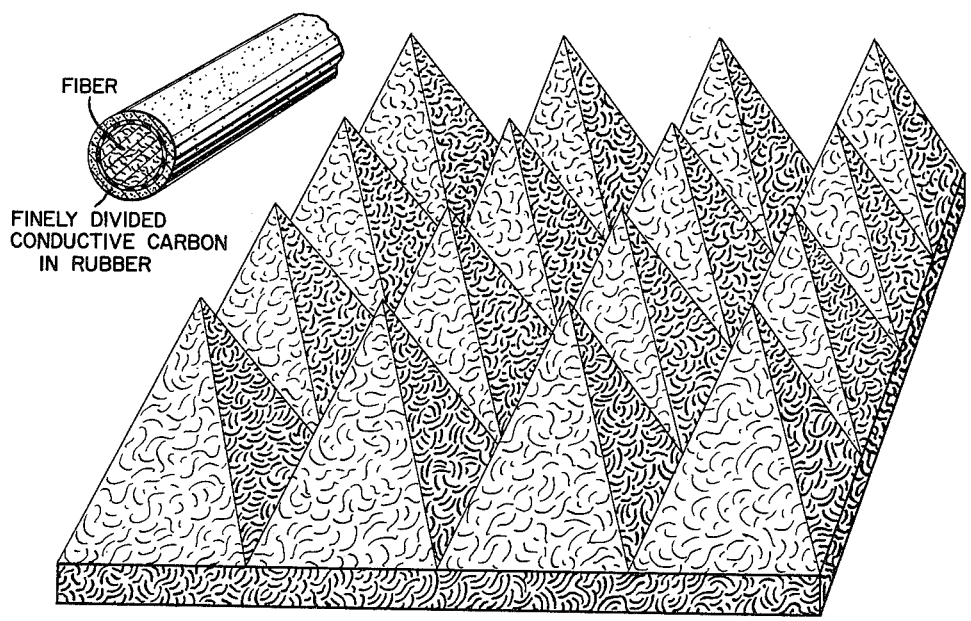
INVENTOR
HOWARD A. TANNER
BY
ATTORNEY

2,977,591
FIBROUS MICROWAVE ABSORBER

Howard A. Tanner, Dayton, Ohio

Filed Sept. 17, 1952, Ser. No. 310,149

2 Claims. (Cl. 343—18)

(Granted under Title 35, U.S. Code (1952), sec. 266)

This invention relates to the absorption of radiant energy, more particularly to a device for the absorption of ultra high frequency radiant energy.

It has heretofore been proposed or known to use lossy dielectric type absorbers for attenuating incident energy in the testing, adjusting or calibration of ultra high frequency transmitters. The lossy dielectric type absorber is a body composed of a solid dielectric in or on which is distributed a high loss substance in the form of a finely divided conductive material. The conductive material serves to absorb incident energy and thus to minimize or prevent transmission of the signal into free space and/or reduce reflection of energy, for example, to the transmitter with consequent possible disturbance of the normal signal.

For many installations of absorbing material, for example, covering of the walls of a room intended for indoor research on radar antennas, it is desirable to have a light weight material in order to reduce the burden on the supporting structure. It is further desirable to have a material which will resist fracture by shock or vibration. The present invention has as its principal object the provision of a lossy dielectric absorber having these properties.

I have found that lossy dielectric absorbers for ultra high frequency radiant energy which are structurally suitable for large surface area installation can be made by employing a low density mass of non-conducting fibers as the dielectric for supporting the conductive material. Absorbers of this construction have the advantages of being relatively light in weight and resistant to fracture under shock or vibration.

In the accompanying drawing, Figure 1 illustrates an absorber of the invention in which the incident surface is planar and Figure 2 a modified form of the absorber of the invention in which the incident surface is non-planar and formed of a series of pyramidal projections whereby the absorber is provided with a tapered impedance which increases in the direction of the base of the pyramids. Figure 3 illustrates in cross-section and exaggerated dimension, a non-conducting fiber coated with finely divided conductive particles suspended in an organic adhesive.

The new absorbers may be made by coating a low density mass of the non-conducting fibers with a suspension of the lossy or conductive particles in a liquid adhesive and drying the wet coated fibrous mass. Among suitable non-conducting fibers are such firm fibers as excelsior, jute, hemp, sisal, etc. Where low density sheets of the fiber are commercially available such as those used for upholstery and padding they may be used. They can also be built up by filling a forming frame with a moderately firm packing of the fiber, the fibers being arranged in random fashion. A practical thickness of the fiber sheet is from about one-half to four inches. Packing of the forming frame may be accomplished by filling it with portions of the fiber which have been previously cohered by pressure into low density units of a depth equal to that of the frame. For the coating and subsequent draining and drying operations, the forming frame is provided with a bottom in the form of a course mesh screen, for example, wire screen of one-quarter to one-half inch mesh. If commercially available sheets of the fiber are used, they are cradled on a screen of like character for the coating, draining and drying operations.

Coating of the fibers with the adhesive suspension of the conductive particles can be done by spraying or dipping the fiber sheet. If spraying is practiced, it should be done to both sides of the sheet for best results. Where dipping is employed, and sometimes also in the case of spraying, the wet coated structure is drained before subjecting it to drying which can be carried out by heating in a vented oven of the circulating air, indirectly heated type. By repeated coating, draining (if necessary) and drying operations, the concentration of the conductive particles can be built up in the mass. The effectiveness of the new absorbers is in large measure dependent upon the amount of the conductive material present, an amount which is either too high or too low being productive of an inferior product. A practical range for conductive particle content in the absorbers is from about 15 to 60% on the total weight of the absorber. The nature of the conductive material and its concentration in the coating composition are important and related variables. Suitable conductive materials, are, for example, graphite powder or other finely divided conductive carbon, e.g. Statex A (conductive furnace black), fine aluminum flakes, iron powder (carbonyl iron), etc. Suitable spraying or dipping consistencies for the adhesive suspension of the conductive particles are from about 20 to 30% total solids content of which the conductive particles constitute from about 25 to 80% by weight and the organic thermoplastic binder of the liquid adhesive from about 20 to 75% by weight. Liquid adhesives which may be used for the coating compositions are, for example, rubber cements, e.g. neoprene (polymerized chloroprene) in solution in xylene, latex emulsions, etc.

Draining and drying of the absorbers in a horizontal position develops a tapered impedance in the absorber by reason of a more or less gradually increasing accumulation of the drained coating composition in the lower zones of the fibrous structure. A tapered impedance can also be effected in the fibrous absorbers by a dipping procedure in which the fiber sheet is dipped into a shallow body of the adhesive-conductive particle suspension at successively decreasing depths of dip, starting with a complete immersion, and at least partially drying after each dip.

A tapered impedance can be mechanically produced in the fibrous absorbers by forming the incident surface of dentate structure. A particular form of dentate surface is shown in Figure 2 in the form of a series of equal altitude pyramidal projections 1 on the base 2. While the pyramidal projections as shown are of quadrilateral design, obviously, the number of their sides may be other than four, for example, three, five or six. A preferred design for the pyramidal projections is one in which the altitude of the pyramids is from about three-quarters to one wave length of the longest wave of the ultra high frequency energy to be attenuated and the base and altitude of the pyramids are in a dimensional ratio of from about 1:2 to 2:1.

The pyramidal projections can be formed out of a sheet of a planar surfaced finished absorber by cutting the coated fibers at a distance above the base of the sheet which is determined by the altitude desired in the pyramids and at an angle to the vertical which is determined by the slope desired for the sides of the pyramids.

To anticipate breakage at the apices, the pyramids are preferably truncated slightly.

The absorbers may be a monolayer or composed of two or more layers and employed with a planar incident surface or with one of dentate configuration. In multi-layer structures better absorption over a range of frequencies can often be realized if the succeeding layers are more and more heavily coated starting with a low amount of coating on the incident layer. An alternative to this is to use more heavily pigmented coating compositions for the layers farther from the incident surface. The thickness of the absorber employed will depend upon the length of the longest wave of the ultra high frequency energy to be attenuated, the longer this wave, the thicker will be the absorber used (measuring from the incident surface thereof). A practical range of thicknesses for the absorbers will extend from about one-half to four inches, although they may be made up and used in thicknesses corresponding to from about one-half to one and one-half and more lengths of the longest wave of the ultra high frequency energy to be attenuated. The new absorbers are contemplated for use over a wide frequency range i.e., from 30,000 to around 2500 megacycles. Corresponding wavelengths range from about 1 to 12 centimeters.

For some uses it is desirable to reduce the inflammability of the absorbers to a point where the material, while still combustible, will not continue to burn alone if ignited. This self-extinguishing property can be readily obtained in the case of absorptive fibers, such as excelsior, by soaking the fibers in a water solution (10 to 50% conc.) of a flame retarding agent, such as ammonium acid phosphate, drying the fibers and then coating them with the adhesive-conductive particle suspension. Flame retarding of non-absorptive fibers is more difficult, but can be accomplished by giving the coated absorber a final dip in a rubber cement heavily pigmented with ammonium acid phosphate. A fairly heavy coating of the flame retarding agent is required, equivalent to a weight increase in the absorber of about 25 to 50%. When the mass of fiber is made up almost completely of materials of low flammability the additional flameproofing may not be required. For example, an absorber made from animal hair, polychloroprene, and graphite or conducting carbon black is sufficiently non-inflammable for many applications. The animal hair may be, for example, curled hog or cow tail hair or mixtures of the same, with a suitable hair mixture being, for example, about 3 to 1 parts, respectively. Non-conducting synthetic fibers of non-inflammable composition, for example, polyvinyl chloride, polyvinylidene chloride and polytetrafluoroethylene fibers (polyvinyl fibers), may also be used and when this is done it is also possible to incorporate part or all of the conducting particles in the original fiber structure at the time the fiber is made, thus reducing or eliminating the need for coating the fiber with a composition of conducting particles and adhesive.

The new lightweight microwave absorbent material of the invention can be used as termination for wave guides by stuffing in the end thereof, as edge filling between parallel conducting plates to simulate infinite plates and about the transmission line in an antenna system to reduce or prevent radiation.

While I have described herein certain specific embodiments of my invention, it is to be understood that they are given primarily by way of illustration and that the principle of the invention may be otherwise embodied without departing from the spirit or scope of the appended claims.

The invention described herein may be manufactured and used by or for the Government of the United States of America for Governmental purposes without the payment of any royalties thereon or therefor.

What is claimed is:

1. A structure capable of absorbing ultra high frequency radiant energy comprising a low density flexible sheet of randomly arranged non-conducting curled organic fibers which are coated with a suspension of finely divided solid conductive material in a rubber binder.

2. A structure capable of absorbing ultra high frequency radiant energy comprising a low density flexible sheet of randomly arranged non-conducting curled organic fibers which are coated with a suspension of finely divided conductive carbon in a rubber binder.

References Cited in the file of this patent

UNITED STATES PATENTS

| | | |
|---|---|---|
| 1,785,357 | Levin | Dec. 16, 1930 |
| 1,954,204 | Hayes | Mar. 12, 1932 |
| 1,966,553 | Kropp | July 17, 1934 |
| 2,341,219 | Jones | Feb. 8, 1944 |
| 2,397,082 | Barker | Mar. 26, 1946 |
| 2,461,005 | Southworth | Feb. 8, 1949 |
| 2,464,006 | Tiley | Mar. 8, 1949 |
| 2,599,944 | Salisbury | June 10, 1952 |
| 2,724,112 | Hepperle | Nov. 15, 1955 |
| 2,822,539 | McMillan | Feb. 4, 1958 |
| 2,828,484 | Skellett | Mar. 25, 1958 |
| 2,870,439 | Stinehelfer | Jan. 20, 1959 |